US011932000B2

(12) United States Patent
Khizar et al.

(10) Patent No.: US 11,932,000 B2
(45) Date of Patent: Mar. 19, 2024

(54) REFRIGERATOR HAVING A MEMBRANE

(71) Applicant: WHIRLPOOL CORPORATION, Benton Harbor, MI (US)

(72) Inventors: Muhammad Khizar, Saint Joseph, MI (US); Maria Paola Pirovano, Molteno (IT)

(73) Assignee: Whirlpool Corporation, Benton Harbor, MI (US)

( * ) Notice: Subject to any disclaimer, the term of this patent is extended or adjusted under 35 U.S.C. 154(b) by 308 days.

(21) Appl. No.: 17/209,924

(22) Filed: Mar. 23, 2021

(65) Prior Publication Data
US 2022/0305757 A1 Sep. 29, 2022

(51) Int. Cl.
*B32B 7/022* (2019.01)
*B32B 1/00* (2006.01)
(Continued)

(52) U.S. Cl.
CPC ............... *B32B 7/022* (2019.01); *B32B 1/00* (2013.01); *B32B 5/024* (2013.01); *B32B 9/007* (2013.01); *B32B 23/08* (2013.01); *B32B 27/08* (2013.01); *B32B 27/306* (2013.01); *B32B 27/308* (2013.01); *F25D 23/066* (2013.01); *F25D 25/025* (2013.01); *B32B 2262/106* (2013.01); *B32B 2307/202* (2013.01);
(Continued)

(58) Field of Classification Search
CPC ........... B32B 1/00; B32B 5/024; B32B 7/022; B32B 9/007; B32B 23/08; B32B 23/10; B32B 27/08; B32B 27/18; B32B 27/306; B32B 27/308; B32B 27/322; B32B 27/34; B32B 2255/10; B32B 2255/26; B32B 2260/021; B32B 2260/046; B32B 2262/106; B32B 2264/202; B32B 2307/202; B32B 2307/302; B32B 2307/42; B32B 2307/71; B32B 2307/7242; B32B 2307/7244; B32B 2307/732; B32B 2509/10; F25D 17/042; F25D 23/066; F25D 25/025; F25D 2201/00; F25D 2317/0413
See application file for complete search history.

(56) References Cited

U.S. PATENT DOCUMENTS 8,196,417 B2 6/2012 Kim et al.
2014/0287641 A1* 9/2014 Steiner, III ............ F41H 5/0471
428/317.1
(Continued)

FOREIGN PATENT DOCUMENTS

CN 111718508 A * 9/2020 ................ C08J 5/18
CN 112300438 A * 2/2021 ............ B65D 65/38
(Continued)

OTHER PUBLICATIONS

English machine translation of the description of CN-112300438-A, obtained from ESPACENET (Year: 2021).*
(Continued)

*Primary Examiner* — James C Yager
*Assistant Examiner* — Thomas J Kessler
(74) *Attorney, Agent, or Firm* — McGarry Bair PC

(57) ABSTRACT

A refrigerator is disclosed for improved food storage capability. The refrigerator comprises an internal cavity having a membrane that at least partially covers a portion of the walls of the internal cavity.

19 Claims, 7 Drawing Sheets

(51) Int. Cl.
  *B32B 5/02* (2006.01)
  *B32B 9/00* (2006.01)
  *B32B 23/08* (2006.01)
  *B32B 27/08* (2006.01)
  *B32B 27/30* (2006.01)
  *F25D 23/06* (2006.01)
  *F25D 25/02* (2006.01)

(52) U.S. Cl.
  CPC ... *B32B 2307/42* (2013.01); *B32B 2307/7244* (2013.01); *B32B 2509/10* (2013.01); *F25D 2201/00* (2013.01)

(56) References Cited

U.S. PATENT DOCUMENTS

| | | |
|---|---|---|
| 2016/0088756 A1 | 3/2016 | Ramadas |
| 2019/0091976 A1 | 3/2019 | Roehrig et al. |
| 2019/0352530 A1 | 11/2019 | Khan et al. |
| 2020/0072530 A1* | 3/2020 | Zhu ................ B01D 53/228 |
| 2020/0163172 A1* | 5/2020 | Khizar ............. H05B 6/6411 |

FOREIGN PATENT DOCUMENTS

| | | |
|---|---|---|
| CZ | 305170 B6 | 5/2015 |
| JP | 2003300292 A * | 10/2003 |
| WO | 2015102614 A1 | 7/2015 |

OTHER PUBLICATIONS

English machine translation of the description of JP-2003300292-A, obtained from ESPACENET (Year: 2003).*
English machine translation of the description of CN-111718508-A obtained from ESPACENET (Year: 2020).*
Reactive Interlayer Based Ultra-Low Moisture Permeable Membranes for Organic Photovoltaic Encapsulation, From the Journal Physical Chemistry Chemical Physics, 16 Pages, https://pubs.rsc.org/en/content/articlelanding/2015/cp/c5cp04255k#!divAbstract, Published Online Aug. 7, 2015.

* cited by examiner

| Visual quality rating of carrots | Day 1 | Day 2 | Day 3 | Day 4 | Day 5 | Day 6 | Day 7 |
|---|---|---|---|---|---|---|---|
| A | green | green | yellow | yellow | red | red | red |
| B | green | green | yellow | red | red | red | red |
| C | green | green | green | yellow | yellow | yellow | red |

REFRIGERATOR HAVING A MEMBRANE

BACKGROUND

Millions of tons of food are discarded every year, prompting the development of efficient food preservation tools and technologies. These new technologies must be energy efficient, low in cost, and should not expose the consumer to toxic contaminates.

The types of food most susceptible to spoilage include meat and fresh produce such as fruits and vegetables. These food items are often stored in separate areas such as bins in a refrigerator in order to precisely control the environmental conditions of storage. The air circulation and humidity levels of these areas can be controlled separately from the main appliance and are variable from conditions in the rest of the refrigerator. Compartmentalized control is an effective approach to manage the food longevity.

BRIEF DESCRIPTION

In an aspect, a refrigerator comprises a sealable internal cavity defined by a plurality of walls, a membrane at least partially covering a portion of the plurality of walls of the internal cavity, the membrane comprising a first layer comprising carbon nanotubes, and a second layer comprising a chemistry configured to be particularly suitable for blocking ingress or egress of gasses.

DETAILED DESCRIPTION

A refrigerator has compartments to store foods according to ideal conditions of storage for different types of food. Storage areas are conditioned by air flow and humidity levels, which can be controlled by the properties of the walls of the compartments. More specifically, the compartments may have a lining or a membrane that allows the user to maintain the humidity level and air flow that is ideal for food storage.

Figure 1:
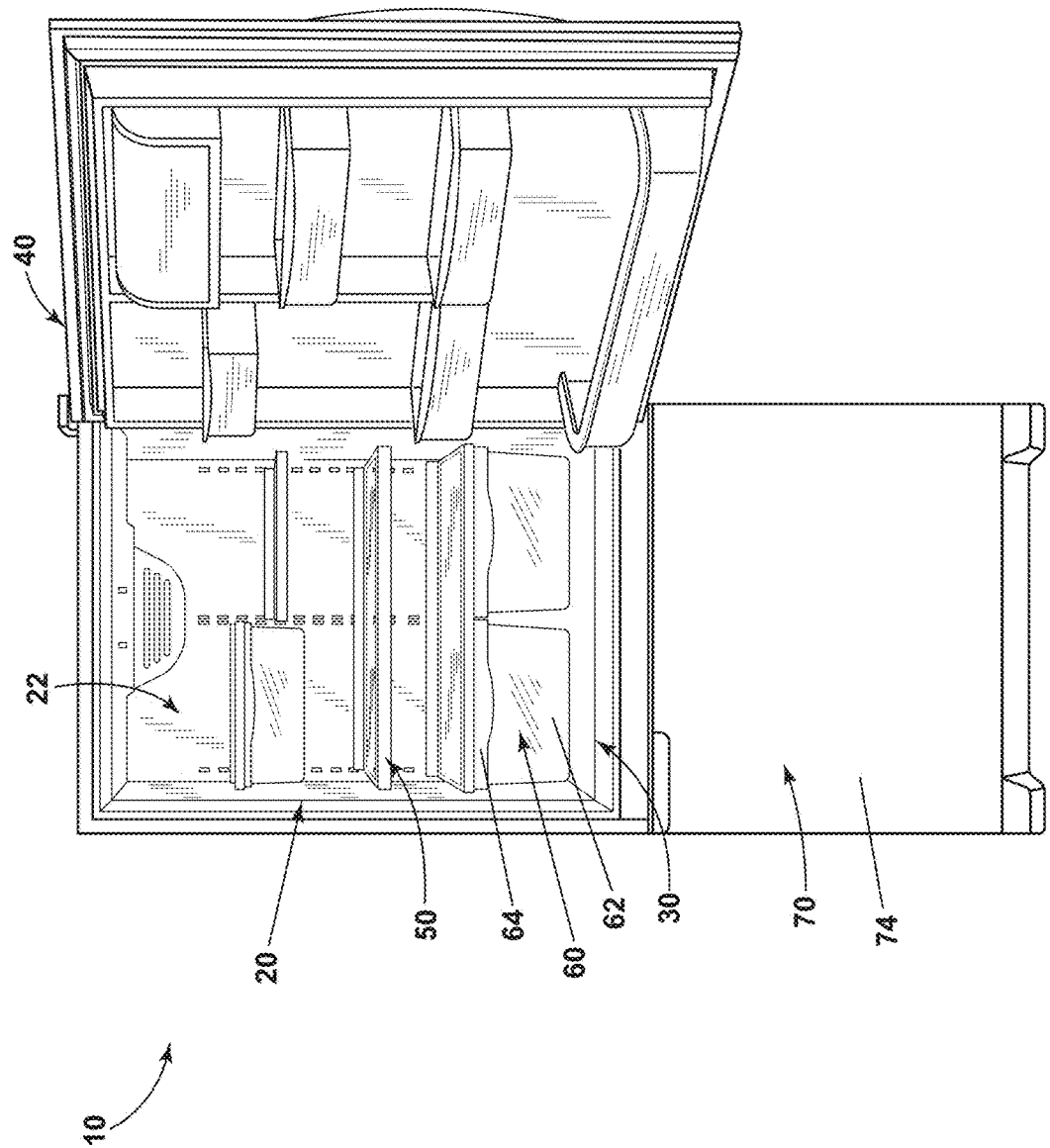
FIG. 1 is a perspective view of an exemplary refrigerator.

For purposes of description herein, the terms "upper," "lower," "right," "left," "rear," "front," "vertical," "horizontal," and derivatives thereof shall relate to the device as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, a refrigerator 10 includes an insulated cabinet 20 having an interior cavity 22 that can be accessed through an access opening 30 by opening door 40. In one example, the refrigerator 10 can have at least one adjustable shelf 50 and at least one sliding drawer or bin 60. The refrigerator 10 can also have additional shelves, compartments and the like inside the interior cavity 22 or on the door 40, as is commonly known in the art. The insulated cabinet 20 can also include an insulated freezer compartment 70 that can be accessed through access opening 72 by opening a drawer or door 74.

Figure 2:
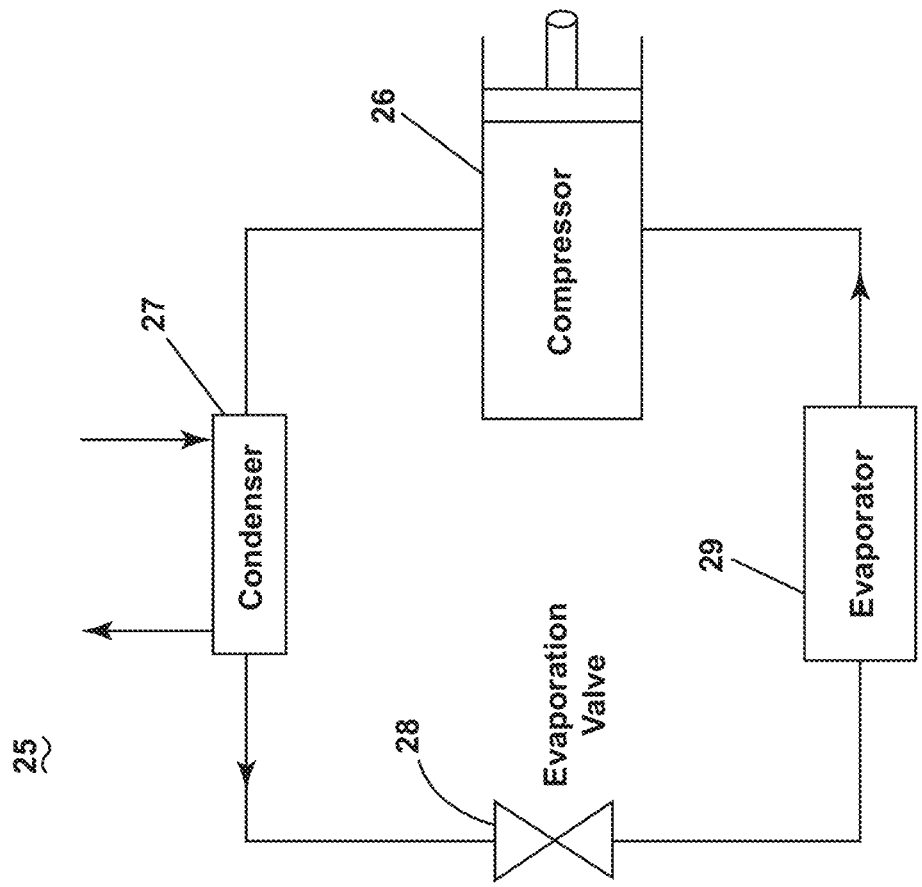
FIG. 2 is a block diagram of the refrigerator cooling system.

FIG. 2 illustrates a block diagram of a refrigeration cooling system 25. Refrigerator 10 can include a cooling system 25 disposed in a machine compartment (not shown). The cooling system may include a compressor 26, condenser 27, valve 28, evaporator 29, and other related components that are generally known in the art. Alternatively, the cooling system may comprise one or more thermoelectric elements.

Figure 3:
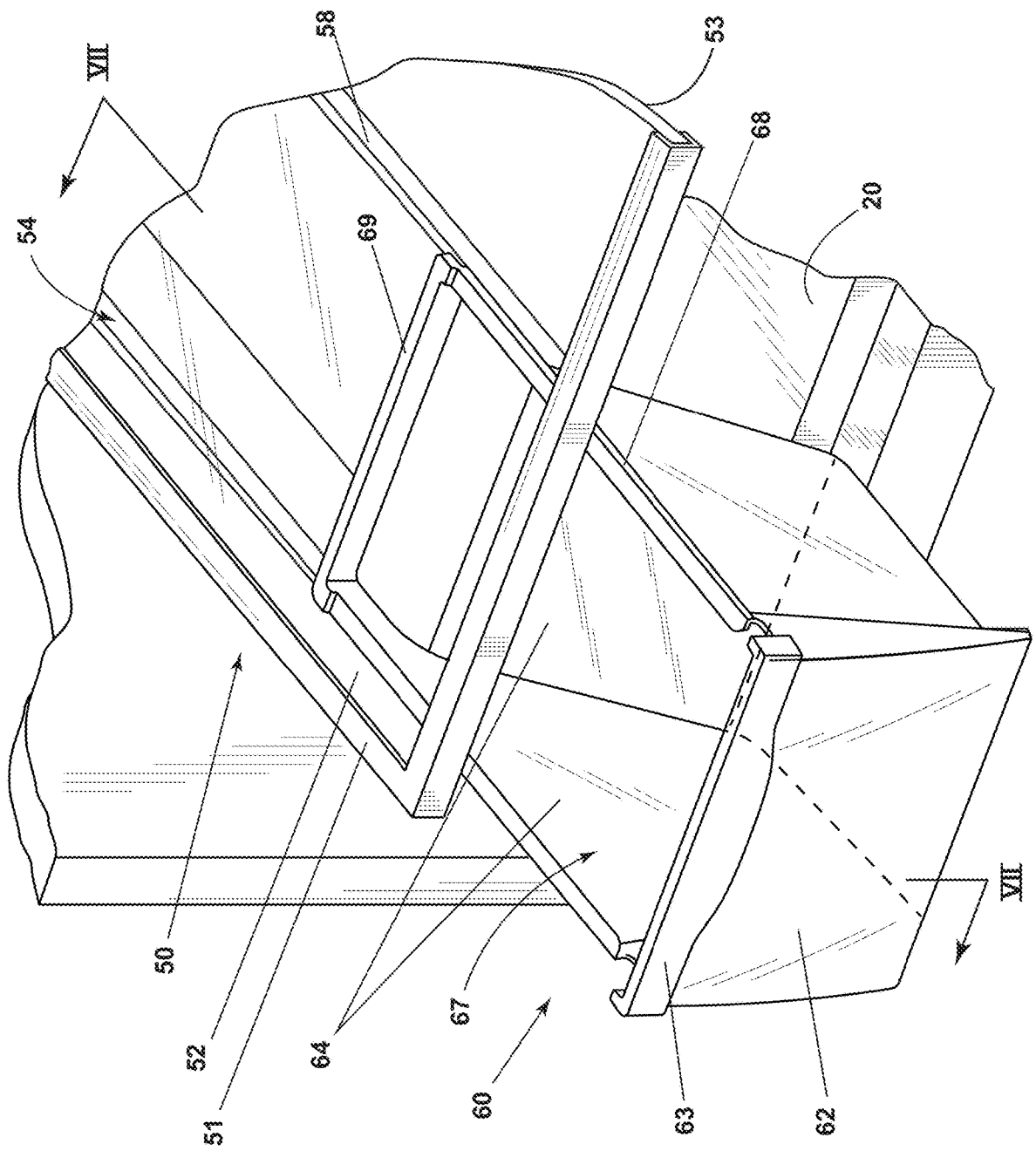
FIG. 3 is a perspective view of a bin in a partially opened position within the refrigerator.

As illustrated in FIG. 3, a frame 51, a plate 52, and a bottom surface 53 may be included in one example of an adjustable shelf 50. The at least one adjustable shelf 50 further includes a mounting arrangement 54 having molded rails 58. The mounting arrangement 54 is located underneath the at least one adjustable shelf 50 to support the at least one bin 60. The at least one bin 60 is slidably mounted on molded rails 58. Alternatively, and additionally, the mounting arrangement 54 can include various glide arrangements, including friction, roller or ball bearing glides.

Continuing with FIG. 3, the at least one bin 60 has a front wall 62 including a handle 63. Further included in the at least one bin 60 are side walls 64 and a bottom wall 66 that partially defines an internal space or cavity 67. The at least one bin 60 is designed to contain fresh food items such as fruits or vegetables within the cavity 67. Slide elements 68 are included on the top of the side walls 65 that slidably engage the molded rails 58 such that the bin 60 can slide along molded rails 58 between open and closed positions. When the bin 60 is in a closed position, an enclosed sealed space is defined by the walls of the bin 60 and the bottom surface 53 of the adjustable shelf 50.

Figure 4:
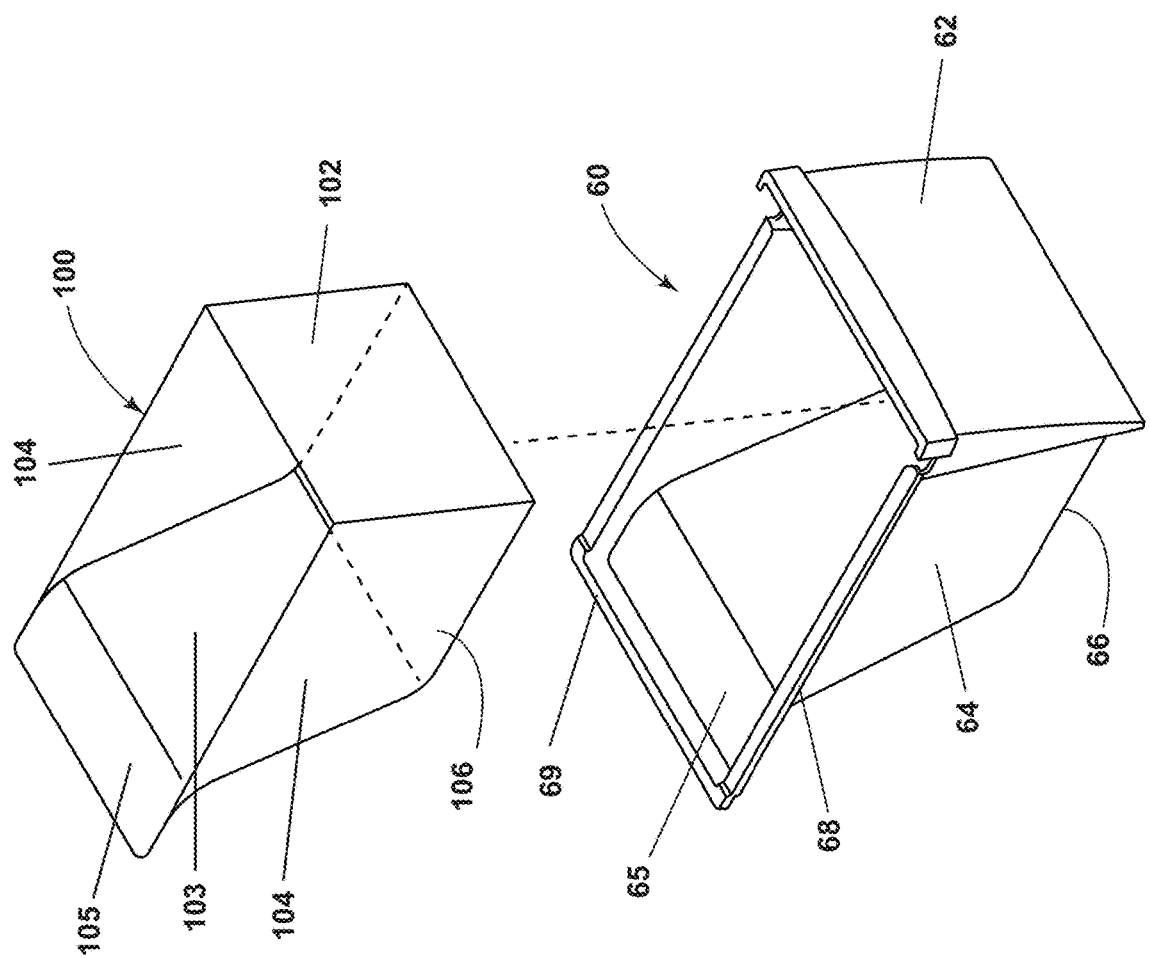
FIG. 4 is an exploded view of the bin of FIG. 3 with a fitted membrane.

Turning now to FIG. 4, in an aspect, a membrane 100 is included in the at least one bin 60 of the refrigerator 10. The membrane 100 is provided to maintain humidity in the cavity 67 for improving food preservation. The membrane 100 is contemplated to be the same shape as the inside of the bin 60 and comprises a front wall 102, side walls 104, a bottom wall 106, and a rear wall 103 that transitions to a lip 105. The upper lip 105 of the membrane 100 can overlap the rear lip 69 of the bin 60 to provide extra material to seal against the membrane underlying the shelf 50. It will be understood that the membrane 100 can be shaped as a unitary piece to cover a single portion or membrane 100 can comprise a plurality of pieces that cover multiple portions of the inside of the bin 60 such as the top, bottom, a sidewall or sidewalls, or any combination of top, bottom and sidewalls.

The membrane 100 is configured to contact the inside surface of the bin 60 and fits inside the at least one bin 60 such that it at least partially, and preferably, entirely covers the front wall 62, side walls 64, and bottom wall 66. The membrane 100 can be removably inserted into the bin 60, confronting and at least partially covering the front wall 62, side walls 65, and bottom wall 66. Alternatively, the membrane could be integrally molded into the bin 60 or adhered to the inner surfaces of the bin 60. Additionally, the membrane 100 can be formed of separate piece for the front wall 62, side walls 65, bottom wall 66 and joined together or separately adhered or attached to the bin 60. As one of skill in the art should recognize, the membrane 100 can also be configured to conform to the shapes of other enclosed spaces in an appliance and other sizes and dimensions without departing from the scope of the disclosure.

Figure 5:
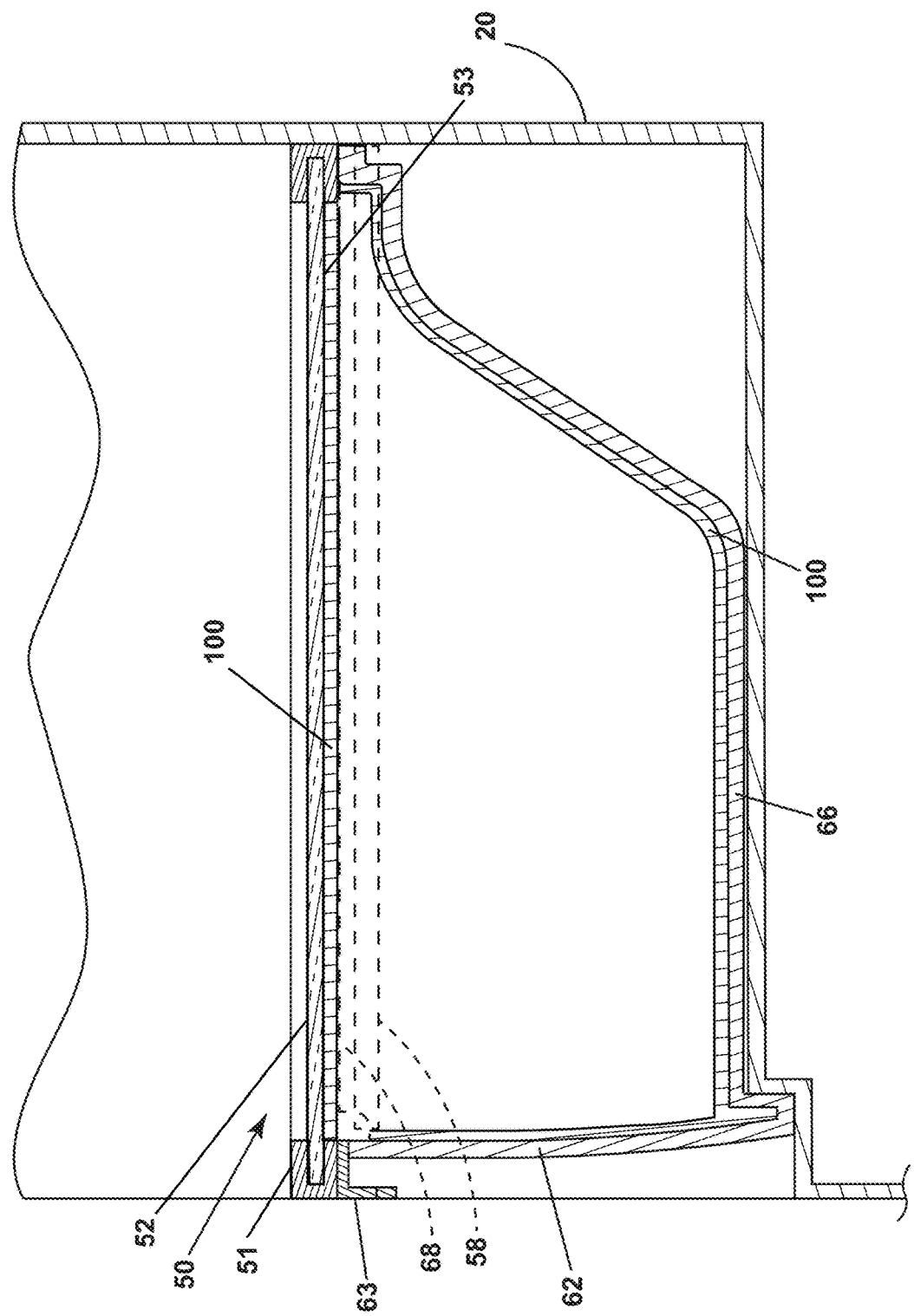
FIG. 5 is a cross-sectional view of the bin with the membrane within the refrigerator in a closed position.

In the closed position, bin 60 is at least substantially sealed with regard to air flow, as can be seen more clearly in FIG. 5. The top of the cavity 67 is covered by the adjustable shelf 50, and more specifically, the portion of membrane 100 fixed to the bottom surface 53 caps the cavity 67. At the top of the side walls 64, slide elements 68 rest on molded rails 58 such that the top edges of the side walls 64 abut a bottom surface 53 of the adjustable shelf 50. The back of handle 63 confronts the frame 51 and a portion of the molded rails 58 enclose the cavity 67. The bin 60 further has a rear lip 69 that abuts the cabinet 20 and the bottom surface 53 when the bin 60 is in the closed position. The adjustable shelf 50 provides a top covering for the bin 60; thus, the interior cavity of bin 60 is closed on all sides and edges when in the closed position. It will be understood that this configuration of bin 60 and adjustable shelf 50 is non-limiting and other configurations are possible that provide a sealed compartment.

Figure 6A:
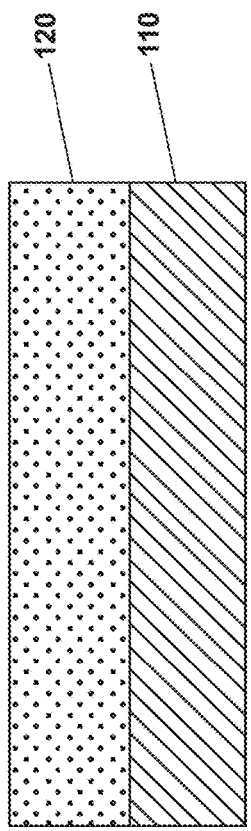
FIGS. 6A and 6B are cross-sectional views of the membrane showing exemplary multilayer structures.
Figure 6B:
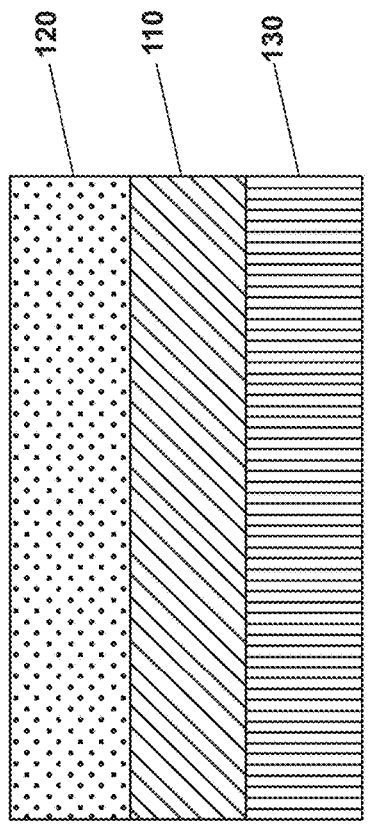

Referring to FIGS. 6A and 6B, the membrane 100 has a multilayer structure and localizes moisture within the bin to improve food preservation. Maintaining a humidity level >70% within a chamber is essential to preventing food spoilage. In one non-limiting example, the membrane 100 can have a first layer 110 and a second layer 120.

The first layer 110 comprises a carbon nanotube material, for example, a woven carbon nanotube yarn material. Carbon nanotubes (CNTs) are non-polar hydrophobic structures with a high aspect ratio. As part of the first layer 110, the hydrophobic CNTs help reject any incident moisture. CNTs are strong, wear-resistant objects, have high thermal and electrical conductivity, and can form porous agglomerates as well as woven materials. The carbon nanotubes in the first layer 110 are functionalized and are associated with at least one type of metallic or metal oxide nanoparticle. The nanoparticles can be covalently or non-covalently associated with the carbon nanotubes and can include nanosized zero-valent iron (nZVI), which is an emerging material used for the removal of contaminants such as toxic organic and inorganic materials from air, water, wastewater, and soil. NZVI is a strong reducing agent and is reactive toward a large number of organic and inorganic compounds, including halogenated hydrocarbons, organic dyes, antibiotics, heavy metal ions. Further, nZVI can have a toxic effect on microorganisms. In the bare form where the surface of the nanoparticles is not capped by an oxide layer or coating, nZVI, reacts rapidly with oxygen and water, and is estimated to be 10-1000 times more reactive than granular ZVI.

When in contact with air and water, nZVI is covered with a thin oxide layer which can be a mixed-valence phase including Fe(0), Fe(II), and Fe(III) such as for example lepidocrocite ($\gamma$-FeOOH), although other phases are possible. A core-shell particle can be advantageous in practical applications due to higher stability. For example, nZVI with an oxide shell is more stable than bare pyrophoric zero valent iron nanoparticles. Furthermore, the oxide shell can be of a thickness that does not block electron transfer from the iron core and therefore the oxide shell does not prevent the beneficial redox processes of the nanoparticle core. NZVI has further beneficial properties as compared to bulk iron, such as environmental remediation, low cost, high reactivity, and good adsorption capacity.

Additionally and alternatively, the nanoparticles in first layer 110 can include, but are not limited to, core-shell nanoparticles of zinc/zinc oxide, copper/copper oxide, or gallium/gallium oxide. Further exemplary nanoparticle compositions include elemental silicon, and elemental metals in the zero valent state such as aluminum, chromium, copper, iron, nickel, silver or gold. The zero valent metals in the nanoparticles can act as reducing agents to degrade undesired gases and other organic compounds. Furthermore, the nanoparticles can act in an antimicrobial capacity to help prevent growth of bacteria, fungi, or mold on membrane 100.

In another aspect, the first layer 110 comprises a polymer blended with carbon nanotubes and zero valent nanoparticles. The polymer used in this first layer 110 can include a two-part clear liquid silicone rubber that can be of fabric coating grade, for example XIAMETER™. In an aspect, the carbon nanotubes can be blended with a hydrophobic non-wetting poly(tetrafluoroethylene).

The second layer 120 acts as a protective top coat and comprises a polymer such as carboxymethyl cellulose, polyacrylamide, polydextrose, polyacrylic acid, or polyvinyl alcohol. Further, the second layer 120 can also comprise polymers of sucrose or citric acid. The polymers that reduce gas and moisture permeability have a plurality of carboxyl, hydroxyl, or carboxamide functional groups, The second layer 120 works as a gas barrier to oxygen, carbon dioxide, ozone, water, and other gases and vapors. Furthermore, the second layer 120 helps protect the integrity of the membrane 100 and, more specifically the first layer 110, from scratches, nicks, and tears. The pinholes or pores present in the first layer 110 are at least partially blocked by the polymer of the second layer 120. The permeability of the multilayer structure of membrane 100 to gas or moisture is reduced by the second layer 120.

The second layer 120 further includes additives such that the second layer 120 acts as a barrier to the transmission of ultraviolet light. Examples of additives include inorganic compounds such as micronized magnesium and zinc oxide or organic additives such as from the family of benzotriazole UV-stabilizers. Together, the combined thickness of the first layer 110 and second layer 120 is between 0.5 to 1.5 mm (0.02 to 0.06 in).

In another aspect, it may be beneficial to include a third layer 130 as shown in FIG. 6B. The first layer 110 is bonded between the third layer 130 and the second layer 120. In this case, the third layer contacts the front wall 62, side walls 64, and bottom wall 66 of the at least one bin 60. The second layer 120 is exposed to the atmosphere of the cavity 67. The third layer 130 can comprise a non-wetting polytetrafluoroethylene (PTFE), where the thickness of third layer 130 can range from 10 to 45 microns (4 E-4 to 18 E-4 inches).

It will be understood that membranes and layers, and other such components as disclosed herein are not limited to the tri-layer or the bi-layer configurations described above, and additional layers of material may also be utilized.

The disclosed membrane offers a number of advantages over current preservation techniques such as photocatalytic filters that produce ozone, antimicrobial coatings comprising titanium dioxide or silver, or UV irradiation. These techniques do nothing to control the humidity of the food storage environment and can introduce detrimental conditions. For example, UV light and ozone can both cause degradation of the polymers that make up interior components of the refrigerator, causing undue damage and decreasing the lifetime of the appliance. The disclosed membrane 100 is a multilayer membrane that includes a pre-polymerized conductive polymer consisting of a blend of carbon nanotubes and nanoparticles. The multilayer structure of membrane 100 serves to prevent leakage of moisture from the food storage area, such as a bin, drawer, or crisper. The CNTs and nanoparticles form a reactive interlayer that helps prevent food spoilage by helping maintain the humidity level within the bin. When carbon nanotubes are blended with hydrophobic poly(tetrafluoroethylene), the surface of the resultant polymer is superhydrophobic and resistant to the formation of microdrops of water, decreasing the wetting. This aspect of membrane 100 allows the humidity within the bin 60 to be maintained. Furthermore, the conductive nature of the carbon nanotube layer offers a protective effect against corrosion or rust buildup. The membrane 100 serves as a barrier film to avoid the leakage of humidity in order to extend the shelf life of stored food in home refrigerators and other related food storage appliances.

Figures 7, 8:
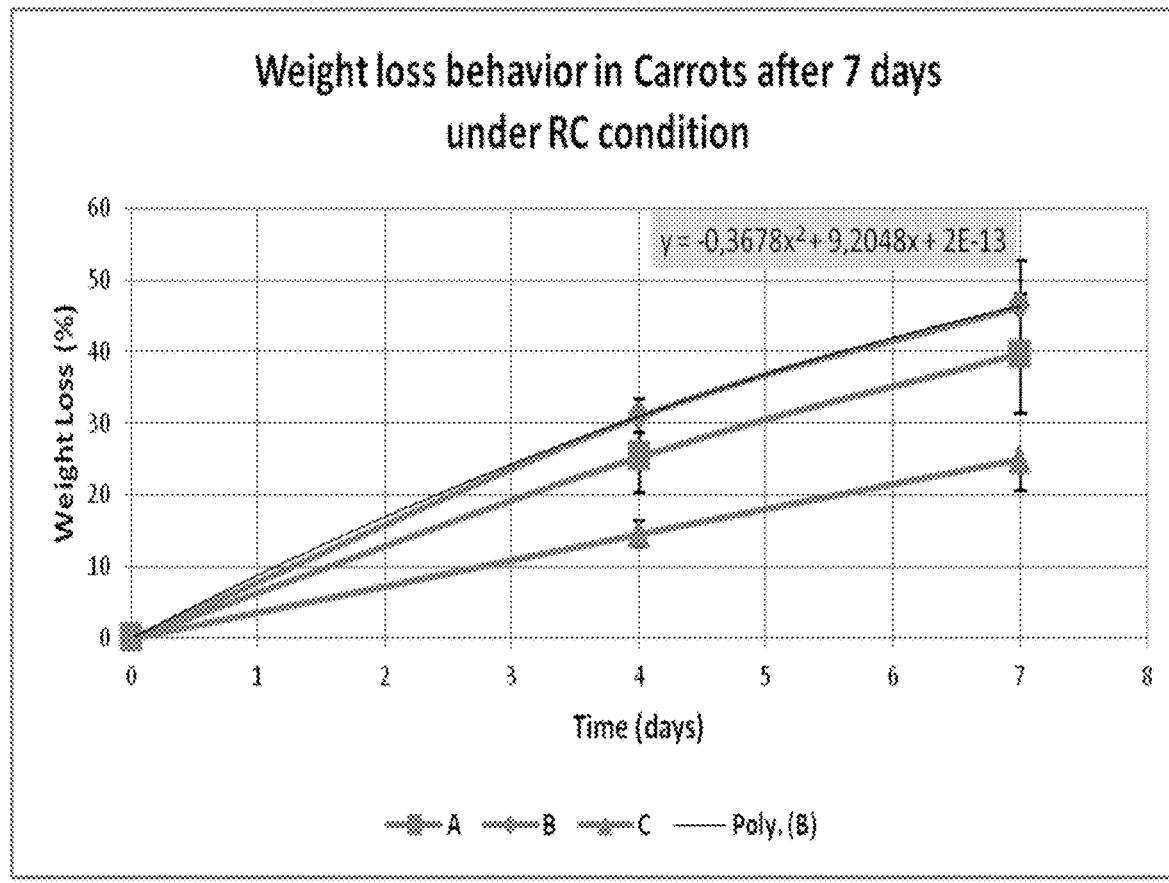
FIG. 7 is a graph of experimental data showing the weight loss of carrots stored in different refrigerator bins over time.
FIG. 8 is a summary of visual quality data obtained for carrots stored in different refrigerator bins over time

To demonstrate the humidity control effectiveness of the membrane 100, carrots were stored in a membrane-containing bin for 7 days (C, FIG. 7) and compared to carrots stored in bins without a membrane (control carrots A, B). The weight loss of the carrots was measured at day 4 and day 7. The carrots stored in bins with the membrane (C, FIG. 7) lost less weight than control carrots (A, B, FIG. 7). According to freshness threshold criteria for % weight loss (0-10% fresh; 11-20% eatable; >21% not eatable), the carrots stored in the bin with the membrane were in both the fresh range and the eatable range for a longer period of time than the control carrots. The color of the carrots was used to evaluate freshness and the results are shown in FIG. 8. The color of the carrots was analyzed on a daily basis for 7 days using image software to provide a visual quality rating (green—fresh, yellow—eatable, red—not eatable). The control carrots (A, B) were considerate fresh until day 2 and eatable until day 3-4. The carrots in the membrane-containing bin however were found to be fresh until day 3 and eatable until day 6.

It will also be understood that various changes and/or modifications can be made without departing from the spirit of the present disclosure. By way of non-limiting example, although the present disclosure is described for use with a bin, it will be recognized that the membrane can be employed with various closable constructions or small spaces, including drawers, containers, holders, shelves and compartments.

To the extent not already described, the different features and structures of the various aspects can be used in combination with each other as desired. That one feature is not illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. While aspects of the disclosure have been specifically described in connection with certain specific details thereof, it is to be understood that this is by way of illustration and not of limitation. Reasonable variation and modification are possible within the scope of the forgoing disclosure and drawings without departing from the spirit of the disclosure, which is defined in the appended claims.

Further aspects of the disclosure are provided by the subject matter of the following clauses:

A refrigerator comprising: a sealable internal cavity defined by a plurality of walls; a membrane at least partially covering a portion of the plurality of walls of the internal cavity; the membrane comprising: a first layer comprising carbon nanotubes; and a second layer comprising a chemistry configured to block the ingress or egress of gasses.

The refrigerator of any preceding claim, wherein the first layer further comprises a two-part pre-polymerized polymer including a liquid silicone rubber.

The refrigerator of any preceding claim, wherein the chemistry of the second layer comprises one or more polymers including one of carboxymethyl cellulose, polyacrylamide, polydextrose, polyacrylic acid, and polyvinyl alcohol.

The refrigerator of any preceding claim, wherein the chemistry of the second layer includes polymers of sucrose, and citric acid.

The refrigerator of any preceding claim further comprising a compressor for cooling the internal cavity.

The refrigerator of any preceding claim, wherein the membrane further comprises a third layer comprising a polymer base coat.

The refrigerator of any preceding claim, wherein the first layer is bonded between the second layer and the third layer.

The refrigerator of any preceding claim, wherein the third layer covers at least a portion of the internal cavity and the second layer is exposed to atmosphere within the internal cavity.

The refrigerator of any preceding claim, wherein the internal cavity is a bin, or drawer or refrigerator liner.

The refrigerator of any preceding claim, wherein the first layer is bonded between the second layer and an interior surface of the refrigerator.

The refrigerator of any preceding claim, wherein the first layer comprising carbon nanotubes includes a woven carbon nanotube material.

The refrigerator of any preceding claim, wherein the thickness of the first layer and the second layer is from 0.5 mm to 1.5 mm (0.02 to 0.06 in).

The refrigerator of any preceding claim, wherein the first layer comprises zero-valent nanoparticles or core-shell nanoparticles.

The refrigerator of any preceding claim, wherein the first layer is conductive.

The refrigerator of claim 1 wherein the second layer includes an inorganic or an organic component that acts as a barrier to transmission of ultraviolet light.

The refrigerator of any preceding claim, further comprising a shelf with a bottom surface and having a plurality of molded rails.

The refrigerator of any preceding claim, wherein the membrane covers at least a portion of the bottom surface of the shelf.

The refrigerator of any preceding claim, further comprising a drawer slidable on the molded rails where the drawer can have a first open position and a second closed position.

The refrigerator of any preceding claim, wherein the membrane covers an entire inside surface of the drawer.

The refrigerator of any preceding claim, wherein in the closed position, the membrane seals the internal cavity.

What is claimed is:

1. A refrigerator comprising:
a sealable internal cavity defined by a plurality of walls; and
a multilayer membrane at least partially covering a portion of the plurality of walls of the internal cavity, the multilayer membrane comprising:
a first layer, provided as a mono-layer, comprising carbon nanotubes and zero-valent nanoparticles; and
a second layer, provided as a mono-layer, comprising a chemistry configured to act as a barrier to transmission of ultraviolet light and to block an ingress or an egress of gases.

2. The refrigerator of claim 1, wherein the first layer further comprises a two-part pre-polymerized polymer including a liquid silicone rubber.

3. The refrigerator of claim 1, wherein the chemistry of the second layer comprises one or more polymers from the group consisting of carboxymethyl cellulose, polyacrylamide, polydextrose, polyacrylic acid, and polyvinyl alcohol.

4. The refrigerator of claim 3, wherein the chemistry of the second layer includes polymers of sucrose or citric acid.

5. The refrigerator of claim 1 further comprising a compressor for cooling the sealable internal cavity.

6. The refrigerator of claim 1, wherein the multilayer membrane further comprises a third layer comprising a polymer base coat.

7. The refrigerator of claim 6, wherein the first layer is bonded between the second layer and the third layer and between the second layer and an interior surface of the refrigerator, and further wherein the third layer covers at least a portion of the internal cavity and the second layer is exposed to atmosphere within the sealable internal cavity.

8. The refrigerator of claim 1, wherein the sealable internal cavity is a bin, or drawer or refrigerator liner.

9. The refrigerator of claim 1, wherein the first layer comprising the carbon nanotubes includes a woven carbon nanotube material.

10. The refrigerator of claim 1, wherein the combined thickness of the first layer and the second layer is from 0.5 mm to 1.5 mm (0.02 to 0.06 in).

11. The refrigerator of claim 1, wherein the first layer is conductive.

12. The refrigerator of claim 1 wherein the chemistry of the second layer includes an inorganic or an organic component that acts as the barrier to the transmission of the ultraviolet light.

13. The refrigerator of claim 1, further comprising a shelf with a bottom surface and having a plurality of molded rails, wherein the multilayer membrane covers at least a portion of the bottom surface of the shelf.

14. The refrigerator of claim 13, further comprising a drawer slidable on the molded rails where the drawer can have a first open position and a second closed position.

15. The refrigerator of claim 14, wherein the multilayer membrane covers an entire inside surface of the drawer, such that the multilayer membrane seals the sealable internal cavity when the drawer is in the second closed position.

16. A refrigerator comprising:
a sealable internal cavity defined by a plurality of walls; and
a membrane at least partially covering a portion of the plurality of walls of the sealable internal cavity, the membrane comprising:
a first layer comprising carbon nanotubes and zero-valent nanoparticles; and
a second layer comprising a chemistry configured to block an ingress or an egress of gases.

17. A refrigerator comprising:
a sealable internal cavity defined by a plurality of walls; and
a membrane at least partially covering a portion of the plurality of walls of the sealable internal cavity, the membrane comprising:
a first layer comprising carbon nanotubes and zero-valent nanoparticles; and
a second layer comprising a chemistry configured to block an ingress or an egress of gases, wherein the chemistry of the second layer includes an inorganic or an organic component that acts as a barrier to transmission of ultraviolet light.

18. The refrigerator of claim 17, wherein the chemistry of the second layer includes the inorganic component comprising micronized magnesium or zinc oxide.

19. The refrigerator of claim 17, wherein the chemistry of the second layer includes the organic component comprising a benzotriazole UV-stabilizer.

* * * * *